United States Patent
Assal (10) Patent No.: US 9,896,170 B1
(45) Date of Patent: Feb. 20, 2018

(54) MAN OVERBOARD DETECTION SYSTEM

(71) Applicant: Sherif Assal, Yorba Linda, CA (US)

(72) Inventor: Sherif Assal, Yorba Linda, CA (US)

(73) Assignee: Surveillance International, Inc., Carson, CA (US)

( * ) Notice: Subject to any disclaimer, the term of this patent is extended or adjusted under 35 U.S.C. 154(b) by 0 days.

(21) Appl. No.: 15/236,361

(22) Filed: Aug. 12, 2016

(51) Int. Cl.
| | | |
|---|---|---|
| *H04N 5/77* | (2006.01) |
| *B63C 9/00* | (2006.01) |
| *H04N 5/91* | (2006.01) |
| *H04N 5/33* | (2006.01) |
| *G06K 9/00* | (2006.01) |

(52) U.S. Cl.
CPC ........ *B63C 9/0005* (2013.01); *G06K 9/00342* (2013.01); *H04N 5/332* (2013.01); *H04N 5/91* (2013.01)

(58) Field of Classification Search
USPC ................................................ 386/223–227
See application file for complete search history.

(56) References Cited

U.S. PATENT DOCUMENTS

| | | | | |
|---|---|---|---|---|
| 6,567,004 B1 * | 5/2003 | Landa | ................ | G08B 21/0211 340/568.1 |
| 7,492,251 B1 * | 2/2009 | Katz | ..................... | B63C 9/0005 340/539.11 |
| 8,384,780 B1 | 2/2013 | Frank et al. | | |
| 8,659,432 B2 | 2/2014 | Alicea-Ibern et al. | | |
| 8,749,635 B2 | 6/2014 | Högasten et al. | | |
| 8,810,436 B2 | 8/2014 | Zagami et al. | | |
| 8,913,066 B2 * | 12/2014 | Okuda | ..................... | G01S 7/04 345/520 |
| 9,047,745 B2 | 6/2015 | Terre et al. | | |
| 9,106,810 B1 | 8/2015 | Hadsall, Sr. | | |
| 9,208,673 B2 | 12/2015 | Grignan et al. | | |
| 9,558,643 B2 * | 1/2017 | Inchausti | ............. | G08B 21/086 |
| 9,569,671 B1 * | 2/2017 | Maali | ................. | G06K 9/00771 |
| 2008/0129518 A1 * | 6/2008 | Carlton-Foss | ........ | A61B 5/1117 340/573.1 |
| 2012/0224063 A1 * | 9/2012 | Terre | ................... | G08B 13/1963 348/148 |
| 2013/0169809 A1 * | 7/2013 | Grignan | ................ | B63C 9/0005 348/148 |
| 2013/0214942 A1 * | 8/2013 | Joss | ..................... | G08B 21/088 340/984 |
| 2016/0210735 A1 * | 7/2016 | Fukushima | ........ | G06K 9/00805 |
| 2016/0214534 A1 * | 7/2016 | Richards | ................ | H04N 5/332 |
| 2016/0340006 A1 * | 11/2016 | Tang | ......................... | B63C 9/01 |
| 2017/0080570 A1 * | 3/2017 | Schnittman | ............ | B25J 9/1694 |
| 2017/0154223 A1 * | 6/2017 | Maali | ..................... | H04N 5/247 |

* cited by examiner

*Primary Examiner* — Nigar Chowdhury
(74) *Attorney, Agent, or Firm* — Fulwider Patton LLP (57) ABSTRACT

The present invention surveils a ship and automatically detects movement around a ship such as, for example, a man overboard condition. Detection is achieved using a continually scanning set of lasers that cooperate with long-wave infrared thermal imaging cameras that are used to classify the movement. If a MOB event is determined, an alarm is then initiated on the bridge of the ship.

9 Claims, 8 Drawing Sheets

MAN OVERBOARD DETECTION SYSTEM

BACKGROUND

Cruise ships for tourism and vacation have become increasingly popular over the last two decades. In 2014, the cruise industry estimated that 22.1 million passengers traveled by cruise ship globally—a four percent increase over 2013's previous high of 21.3 million. Coupled with an annual occupancy percentage again exceeding 100 percent, this passenger growth shows sustained consumer interest in cruising and an industry where demand continues to outstrip supply. Cruise lines released an additional 15 full service cruise ships in 2014, but they also enhanced demand by establishing and increasing their presence in international ports-of-call.

The vast number of these passengers enjoy a fun filled, vacation without incident. For a very small fraction of these passengers, however, the experience ends in tragedy. It is estimated that over two hundred incidents of "man overboard" has occurred since the year 2000, where a passenger jumps, falls, or by other nefarious means introduced into the cold sea below. Most ships are equipped with rescue equipment, and some ships are also equipped with man overboard ("MOB") detection equipment, but most systems are either ineffective or incapable of quickly and accurately determining a true MOB occurrence from the numerous false alarms that occur.

Thus, the art desperately needs an improved surveillance and early detection system that signals to the bridge of a ship when a person falls overboard from a commercial, military or cruise ship. When dealing with person overboard scenarios there are few moments to spare in stopping the vessel, turning the propulsion machinery away from the person overboard before a true catastrophe at sea occurs, and initiating a rescue. Depending on environment and extraneous circumstances, a crew may only have moments to even detect the person overboard and initiate rescue before it is too late. To work effectively each major component in the system must work in tandem with one another to provide the fast response times such that crew members can appropriately respond to the emergency occurring within a prescribed perimeter that surrounds the vessel.

Until now solving the person overboard problem had not yielded satisfactory solutions, in part because the sensors required to detect an event that occurred over a span of 180 degrees in close proximity to the sensor head and thereafter accompanied by the means to capture the event itself were unavailable. A significant reason why a satisfactory solution has not been found is that the detection of a relatively small object (e.g., size of a baby) falling from a ship, relative to a sensing and detection mechanism, has a very high angular rate of change. On the other hand the recording of such object must precede its detection and encompass the entire trajectory of the object from the point of departure from the ship until it contacts the water. The industry needs a solution where an integrated system has the requisite sensitivity, accuracy of positioning and low cost.

The prior art has attempted to solve this problem with mixed results. U.S. Pat. No. 8,384,780 to Frank et al. discloses a Man Overboard System that uses cameras to constantly monitor the perimeter of a vessel. The vessel includes a plurality of image capture components coupled to the vessel to capture infrared images around at least a substantial portion of a perimeter of the watercraft, and stores the image in a memory. The images are processed by a computer, and an alarm is activated if the man overboard condition occurs. Frank's Near Infrared (NIR) cameras relies on the non-thermal wavelength spectrum between 700 nm-1 mm. It has been found that using NIR cameras do not have the requisite accuracy to consistently detect images the size of babies or small children, and so it is not an optimal solution to the problem.

U.S. Pat. No. 8,659,432 to Alicea-Ibern et al. teaches a security system for automatically detecting and signaling the event of a person falling overboard from a vessel into a body of water. The system requires that passengers wear a radio frequency identification (RFID) tag, and places one or more RFID readers placed surrounding the hull of the vessel. The RFID readers detect when an RFID tag enters the water, and sounds an alarm while pulling up information on the passenger associated with the specific RFID tag. When a person who is wearing the RFID tag falls overboard, he or she would inevitably pass through one or more of the RFID readers placed surrounding the hull of the vessel. The control unit records the time and location of the event, and activates an alarm system for facilitating the rescue of the person. However, if a passenger removes the RFID tag, or the reader fails to detect the tag, the system is inoperative. Thus, this is also not an optimal solution.

U.S. Pat. No. 8,749,635 to Högasten et al. discloses an infrared camera system and methods for dual sensor applications to detect a man overboard condition. In one embodiment, the system comprises an image capture component having a visible light sensor to capture visible light images and an infrared sensor to capture infrared images. The system comprises a first control component adapted to provide a plurality of selectable processing modes to a user, wherein the plurality of selectable processing modes includes a visible light only mode, infrared only mode, and a combined visible-infrared mode. The system comprises a processing component adapted to receive the generated control signal from the control component, process the captured visible light images and the captured infrared images according to the user selected processing mode, and generate processed images based on the processing mode selected by the user. This patent adds the visible light spectrum, 380-750 nm, but still includes the drawbacks of the Frank patent discussed above. This approach has been proven to have create numerous false alarms and has been rejected by the industry.

U.S. Pat. No. 8,810,436 to Zagami et al. discloses a system for detecting the presence of a person overboard by scanning the area 180 degrees in azimuth utilizing a laser beam. The system detects the reflection of a beam, and plays back a video recording of the trajectory of the person, wherein the area above and below the perimeter of an area to scan is continuously video recorded and wherein upon detecting the target, one or more of audio and visual alarms alert that crew, and wherein an alarm with location is sent to PDA system with GPS coordinates, time, and date. Zagami uses a visible spectrum camera, and its laser scanners operate in a 180 degree arc. Visible light cameras do not provide visual in the evening hours due to the lack of visible light, thus not providing visual confirmation of a man overboard event.

U.S. Pat. No. 9,106,810 to Hadsall, Sr. discloses a man overboard detection system that includes cameras positioned around a perimeter of a vessel. The system analyzes video from the cameras to detect a falling object from the vessel and records a geolocation of the vessel at a time of falling of the object. The system applies environmental readings (wind, wave currents, etc.) to evolve a recovery location for the falling object from the time of falling to a present time.

U.S. Pat. No. 9,208,673 to Grignan et al. discloses a monitoring system for a periphery of a vessel comprises a monitoring module that are microwave or radar to detect falling objects around the vessel. A detector has an imaging resolution that prevents conclusive visual identification by a human operator of the nature of the body. The monitoring module also comprises a video capture apparatus arranged to provide video data. The system also comprises a, monitoring station apparatus arranged to receive data from the monitoring module. In response to detection of the passage of the body by the detection system, the monitoring station enables the operator to review the video data. The video data enables the operator to identify readily the nature of the body detected and thereby to provide confirmatory visual evidence when the body is human.

U.S. Publication No. 2013/0214942 to Joss discloses a system for detecting a man overboard event, including tracking and recovery used for analyzing conditions on and/or around a ship or vessel located on a body or water. The man overboard detection, tracking and recovery system generally includes the ship, members of the ship, transmitting device, a ship based man overboard detection system, a man overboard (when in the detection, tracking and recovery mode), and an overhead receiving and communication system. The man overboard detection, tracking and recovery system may also include a marking/tracking device, and/or a recovery craft.

The prior art systems all lack a comprehensive, robust solution for surveillance, detection, and tracking of a MOB occurrence in daylight or evening, that can also apply computer analytics (learning) of the ships environment and structure to progressively improve detection. The present invention overcomes this shortcomings and drawbacks of the prior art systems.

SUMMARY OF THE INVENTION

The present invention is a Man Overboard surveillance and detection system that continually scans the exterior of a ship with Near-Infrared Light Detection and Ranging Lasers (NIR-LIDAR) at up to 100 times per second, detecting objects with an area of as little as a single square inch, but is typically set to ten square inches to detect the smallest child. The NIR-LIDAR cameras are arrayed around the ship so that the units provide 30% overlapping coverage. The present invention uses camera detection of an electromagnetic radiation in the spectrum of 8-15 µm, commonly referred to as the long wave IR (LWIR) portion of the spectrum. When an object is detected by the NIR-LIDAR detectors, it is automatically analyzed by Long-Wave Infrared thermal imaging cameras which provide classification of the alert. An alarm is then initiated on the bridge of the ship. The audible and visual alarm is automatically cued for review by the bridge officers.

The present invention uses software that provides a graphical overview of the sensors with interactive and multi-layered maps. The alarm manager integrates with Global Positioning Systems (GPS) on-board the ship and displays the shipboard location of the alarm, the GPS coordinates, and thermal video playback. The accept & reject functionality allows the bridge officer to not only acknowledge events, but mark events as positive and negative, allowing the processing engine to further refine itself based on identified false alarms, thus reducing the overall false alarm rate over time. That is, the system interprets the positive and negative events, and adjusts future detection alerts based on the learning of prior events. In addition, it allows positive marking when conducting testing to enhance the systems awareness over time. This feature allows the present invention to achieve a self-learning architecture, allowing feedback to refine the detection based on an individual ship/system architecture.

Video and Alarm retention and backup is a feature of the present invention's reliability. A backup storage subsystem is located at every camera, acting as a buffer between live video being captured, analyzed, and transmitted across the network to the server and workstations. In the event of a server failure or outage, or a network failure or outage, live video and events are continuously recorded and retained locally at the camera providing a fully redundant system for video storage, maximizing uptime and compliance, and reducing the likelihood of a single item system failure from causing system wide disruption.

These features and other improvements in the present invention are best understood in light of the description of the preferred embodiment below along with the accompanying figures.

DETAILED DESCRIPTION OF THE PREFERRED EMBODIMENTS

Figure 1:
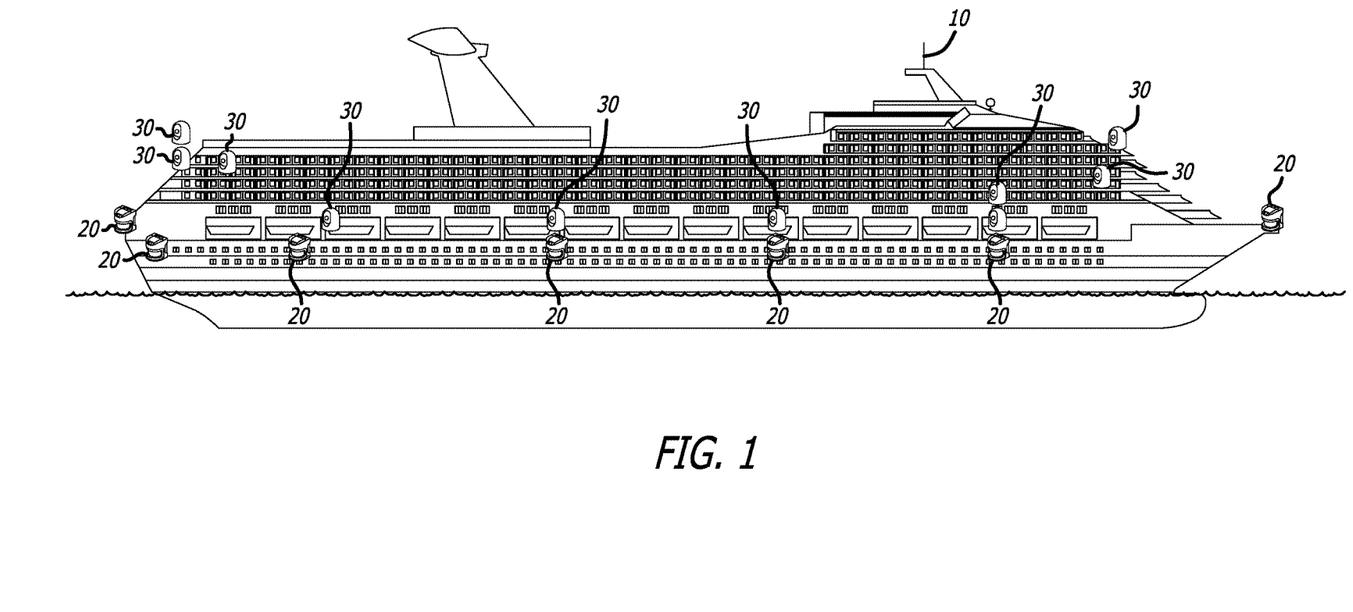
FIG. 1 is a side view of a ship with laser detectors and thermal imaging cameras positioned around the perimeter of the ship.

The present invention is a man overboard surveillance and detection system for a ship that works in any light condition and allows rapid and effective response to an MOB event. FIG. 1 illustrates a multi-deck cruise ship, although it is to be understood that the present invention will have many applications and that the invention is not limited to any particular vessel or application. The ship is equipped with navigational equipment, such as radar and GPS tracking equipment to determine a precise location of the ship.

In the present invention, the ship is further equipped with mounted detection equipment that forms a veil of detection around the ship at all times when the system is active. The detection element of the system utilizes a dual monitoring aspect as explained below. The first aspect of the detection element is a plurality of thermal imaging cameras. Thermal imaging cameras operate on the principle that all objects, even very cold objects, emit thermal energy in the portion of the infrared spectrum that the camera can detect, i.e., the long wave infrared (LWIR) range of the spectrum. Therefore, unlike an illuminated near infrared (NIR) camera, the thermal imaging camera does not need an additional active illumination source and images are based on directly radiated rather than reflected energy. This allows the system to work effectively in daylight or night time, and provides a thermal signature of an object falling from the ship. The camera may also have a dual mode equipped with both a thermal imaging camera and a visible-light (DLTV) camera, either low-light or color. Examples of such systems include the M-Series thermal vision cameras by Flir Systems, Inc. of Goleta, Calif.

The second aspect of the detection system is a continuously scanning laser detection unit. In a preferred embodiment the laser detection units can rotate to two hundred and seventy degrees or even three hundred sixty degrees for a full panoramic view and maximum coverage in the zone of detection. The laser detection units (LDU) continually scans the exterior of the ship with Near-Infrared Light Detection and Ranging Lasers (NIR-LIDAR) at up to 100 times per second, capable of detecting objects with an area on the order of 10 square inches, falling or ascending. In a preferred embodiment, the NIR-LIDAR units are arrayed around the ship so that the units provide a thirty percent overlap in the coverage about the ship's perimeter. When an object is detected by the NIR-LIDAR, it is then automatically analyzed by Long-Wave Infrared thermal imaging cameras. This analysis provides a classification of the event, which is indicated by an alarm directed to the bridge of the ship. The alarm, preferably audible and visual, is automatically cued for immediate review by the bridge officers. In FIG. 1, the NIR-LIDAR detectors 20 and the Long-Wave Infrared thermal imaging cameras 30 are shown positioned around the perimeter of the ship to effect the zone of detection around the ship.

Figure 2:
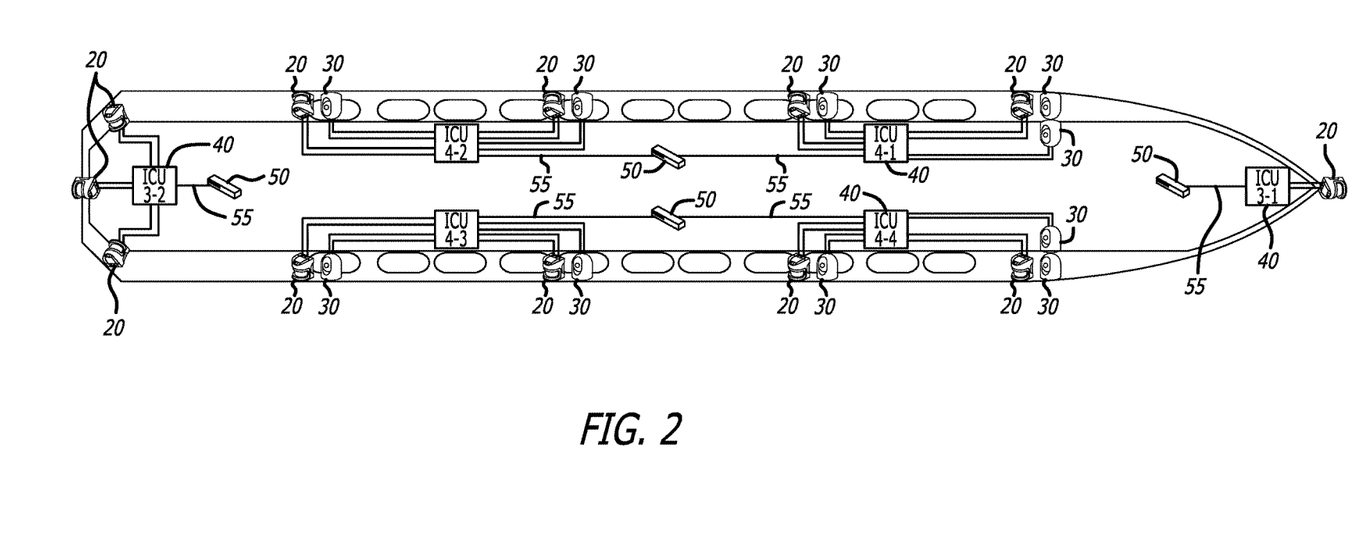
FIG. 2 is a schematic view of the surveillance and detection system.
Figure 3:
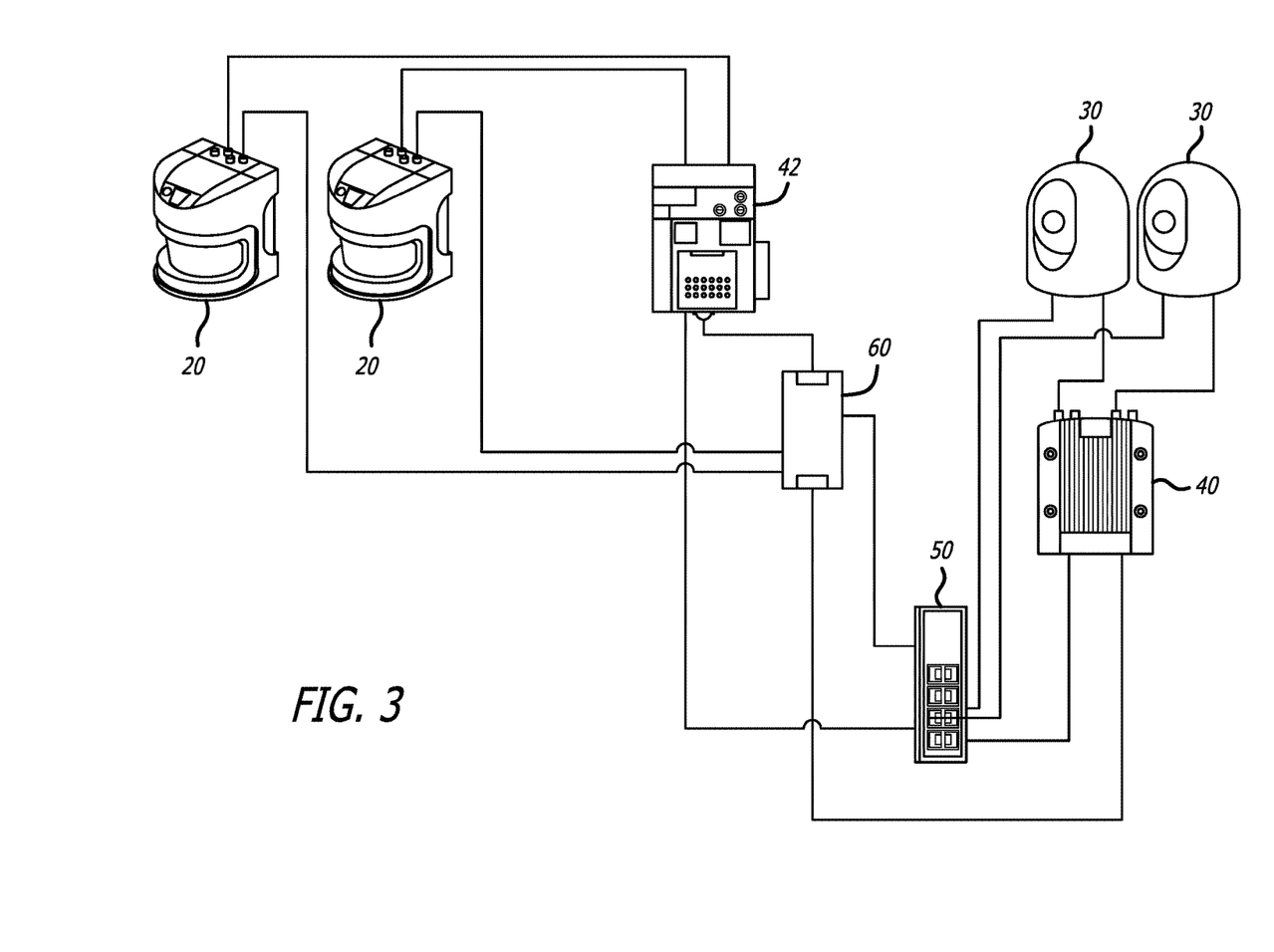
FIG. 3 is a general schematic of the data processing system of the present invention.

FIG. 2 illustrates a schematic for the laser detectors 20 and thermal cameras 30 arranged around the ship's perimeter. Each section of the ship is covered by a camera group that includes both thermal cameras and laser detectors. The video feed from the laser detectors 20 and thermal cameras 30 are directed to a video encoder for converting analog video (if present) to a digital stream via processing units 40, 42, and then to one of a network of servers 50 connected by an ethernet cable or other connection. This can be seen more simply in FIG. 3, where the ship's electrical power 60 provides the electricity to operate the cameras and the video processing equipment as shown.

Figure 4:
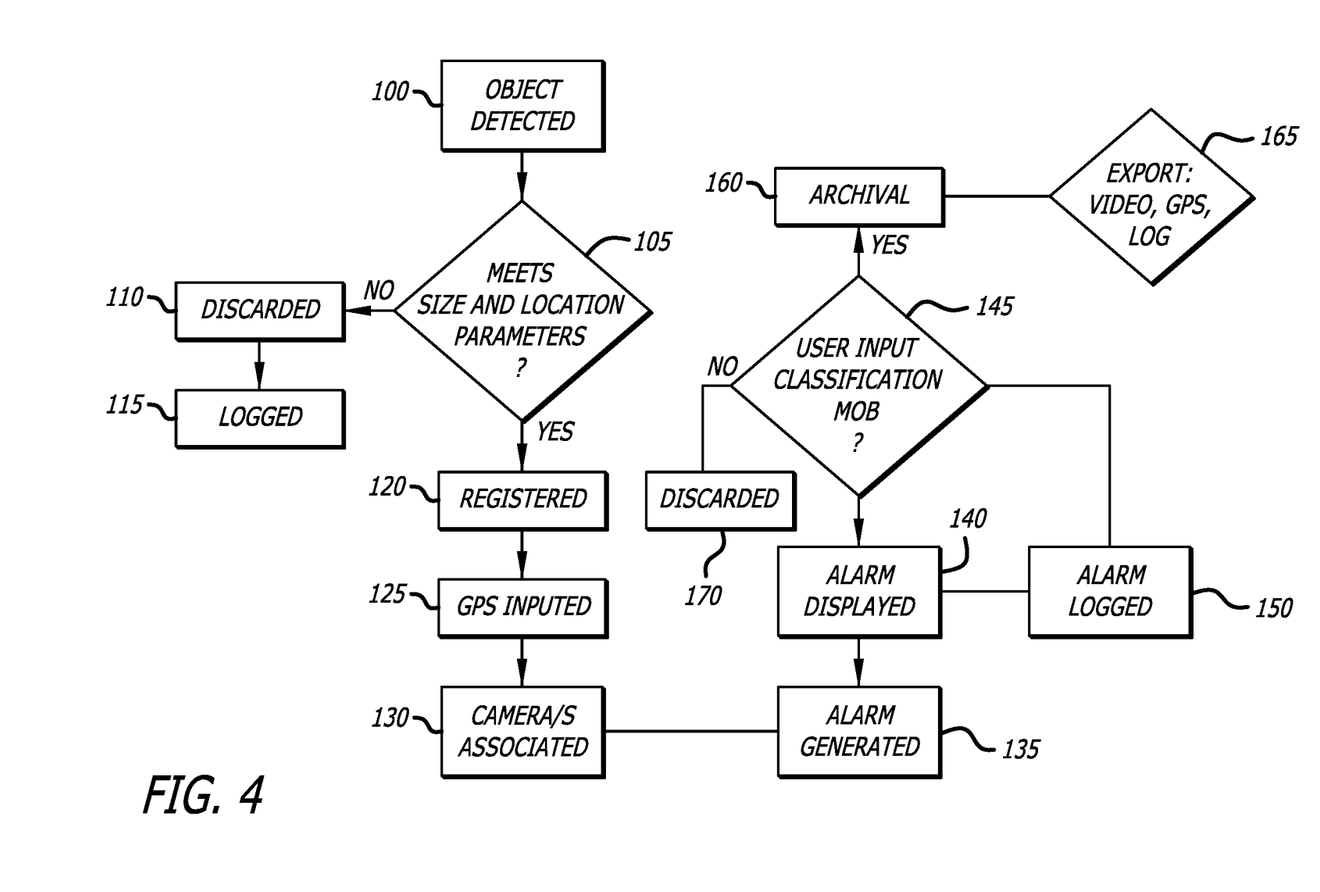
FIG. 4 is a flow chart for the control of the system of the present invention.

FIG. 4 is a flow chart that illustrates the software that controls the system and method of the present invention. The flow chart begins with the detection of an "event" by the laser detector, which is followed by a video recording by the thermal camera at step 100. The initial step 105 is to make sure that the object is within the size parameters for the man overboard condition, i.e., the object has an area that is within a range for a human (including a small child or infant). If the object is deemed to not be within a specified range, the program rejects the event in step 110 and no alarm is initiated, although the incident is logged for data collection purposes in step 115. If the object is deemed to be within the range of a human, the event is registered in step 120 and the GPS location of the ship is identified and recorded in step 125. The detectors and cameras that registered the event are identified in step 130, and an alarm is sent to the bridge of the ship in step 135. The alarm is preferably audible and visual, and calls for immediate attention of the crew. The alarm includes a display in the invention's software showing the location of the event along with other relevant details (time, cameras, GPS), and offers an immediate replay as well as live video of the area where the event occurred in step 140. The user then makes a determination if the event is a MOB situation, or if it is a false alarm in step 145. The alarm is logged in step 150, and the video feed along with the associated information is stored in a memory in step 160 where it can then be exported to other users for rescue, etc. in step 165. If a determination is made after viewing the video that the event is not a MOB situation, the alarm is discarded in step 170.

Figure 5:
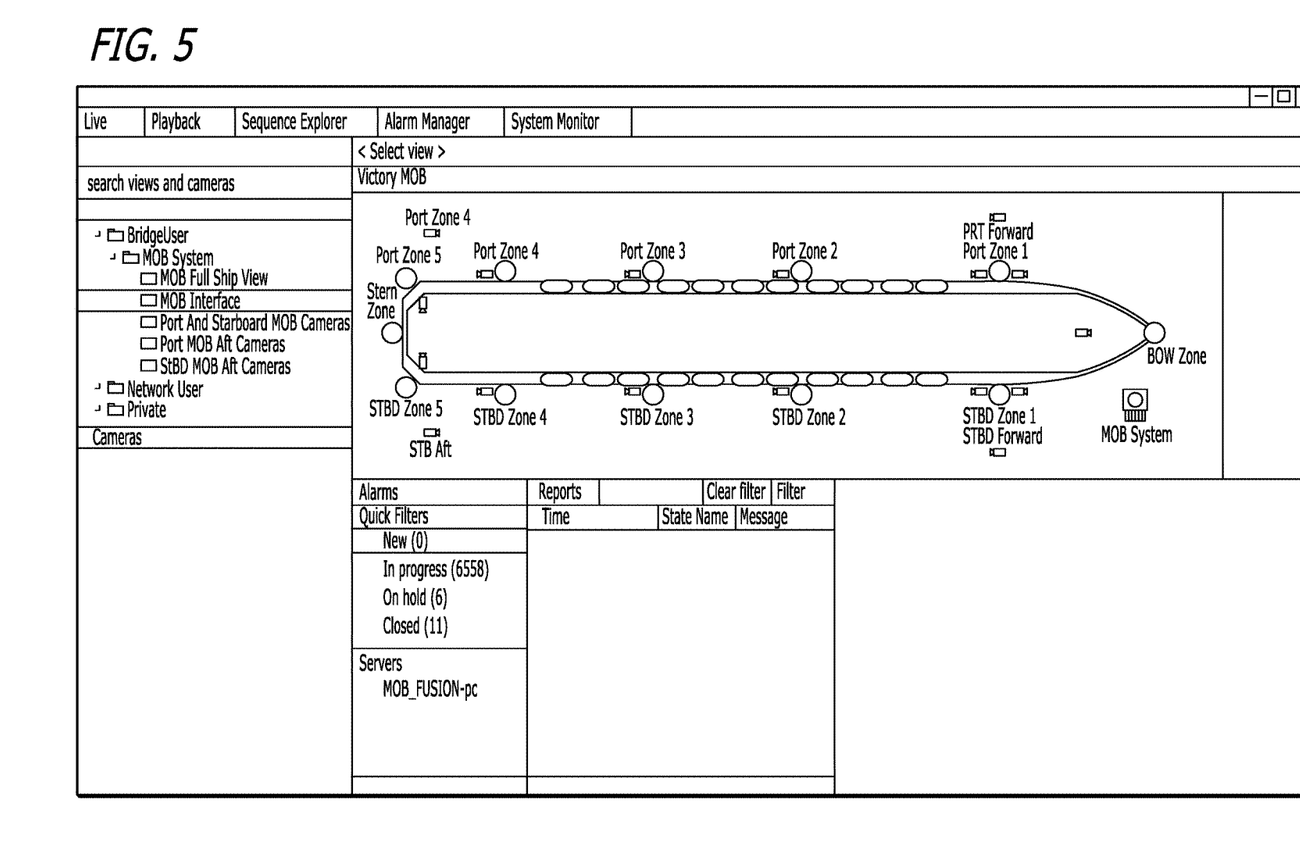
FIG. 5 is a screen shot of a bridge display and graphical interface.
Figure 6:
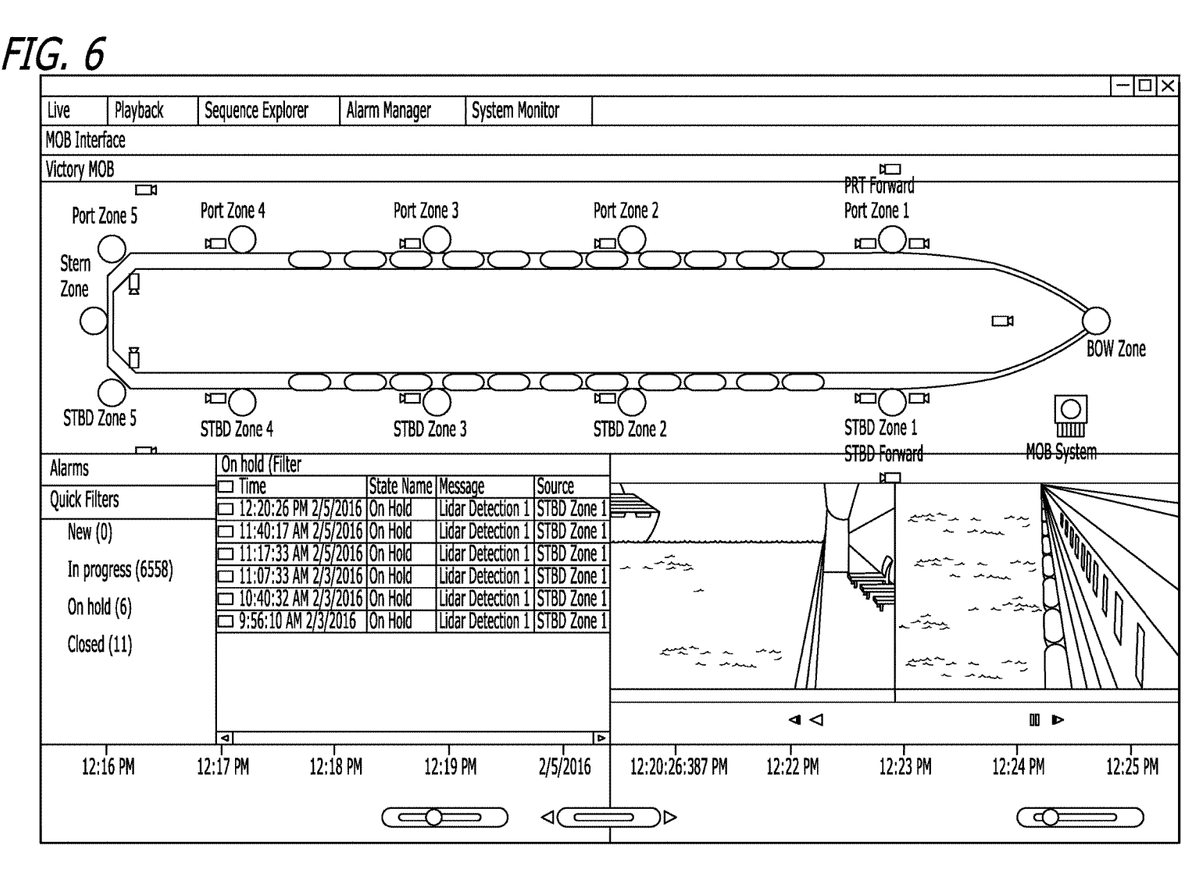
FIG. 6 is a screen shot of the interface with a video playback.
Figure 7:
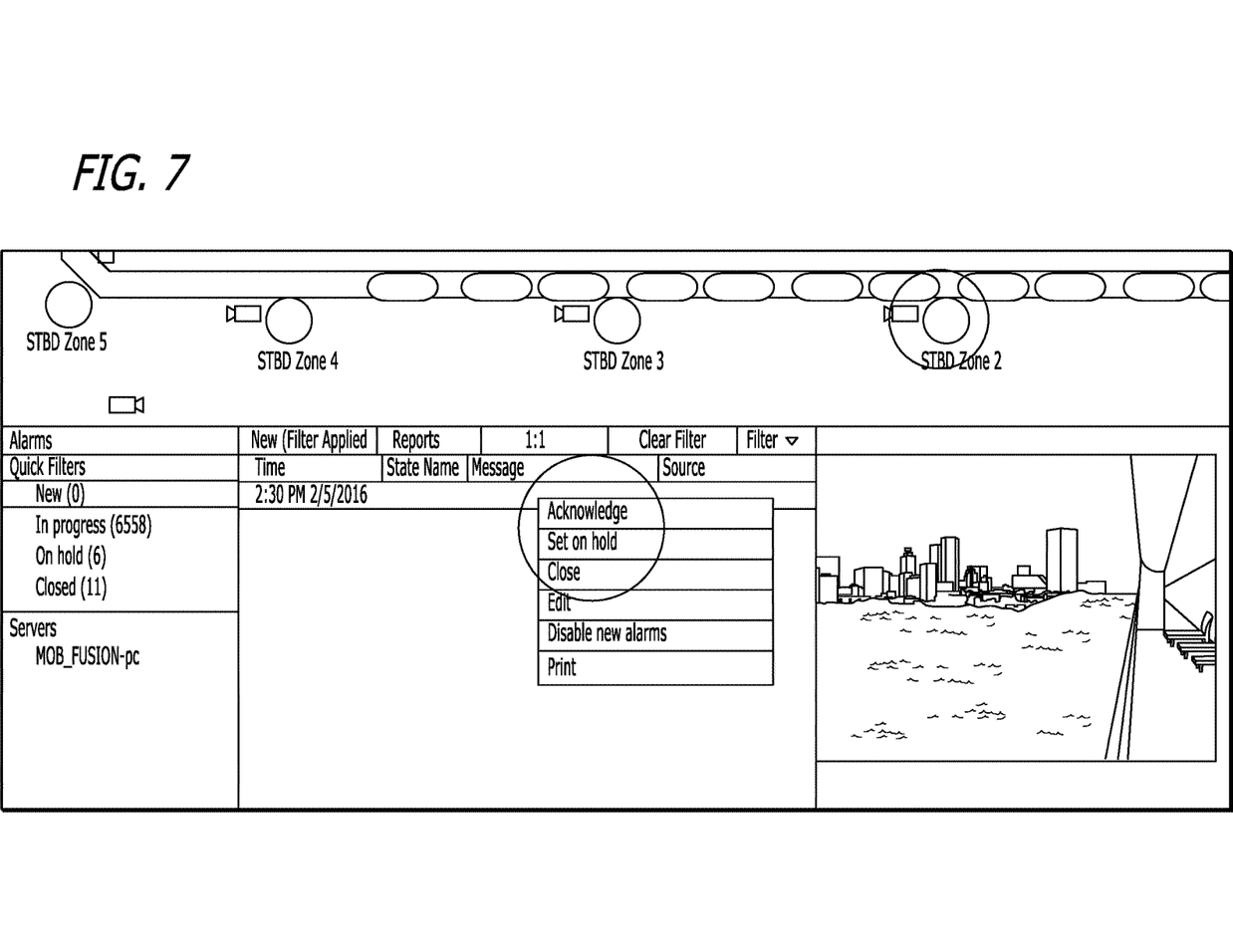
FIG. 7 is a screen shot of the interface acknowledging an alarm.

The display shown in the bridge includes an graphical interface for navigating the various just described steps. FIG. 5 illustrates a primary screen of the ship and the status of the detection system. The various zones about the ship's bow, stern, port, and starboard are depicted on the display, along with a pull-down menu for navigating the software. In FIG. 6, video playback is recalled from a selected camera using the controls, where the playback can reference a particular alarm and zone. A portion of the screen displays the video from the camera that is associated with the laser detector that precipitated the alarm. A timeline is displayed concurrent with the playback to indicate the timing of the event, and the user can also switch to a realtime video feed of the camera or other cameras to investigate the event further. In FIG. 7, a display is shown to deal with an alarm (step 145 of FIG. 4). When an alarm occurs, the event is indicated by a flashing circle like below of the zone of detection and an audible signal. By selecting the alarm below, it will automatically play back the video. The system is sensitive to objects over 10 inches in size, so it is anticipated that there will be some false alarms from birds, debris or towels blown over the deck, water near the detection of the laser system onboard, etc. In the case of a false alarm, there are different ways to acknowledge the alarm. "Acknowledge" will put the event in a "In progress" state until it has been further assessed to put in a "Closed" state. "Set on hold" will put the event in a permanent hold, and this is for an actual "Man Overboard" situation. Once a video archived and exported, it can be changed to a "Closed" state. "Close" for any clear false alarms such as birds, deck cleaning, life boat testing, miscellaneous objects that may cause the unit to falsely trip you can select "Close." Prior to "Closing the Alarm," the system prompts the user to input a note to detail the nature of the alarm. Detailed logs are stored to record all actions on the system.

The alarm manager software interface thus provides a graphical overview of the sensors with interactive and multi-layered maps. The alarm manager integrates with Global Positioning Systems on-board ship and displays the shipboard location of the alarm, the GPS coordinates, and thermal video playback from the associated thermal camera. The accept/reject functionality allows the bridge officer to not only acknowledge events, but mark events as positive and negative, allowing the processing engine to further refine itself based on identified false alarms. This learning aspect of the invention aids in reducing the overall false alarm rate over time. In addition, it allows positive marking when conducting testing to enhance the systems awareness over time. This provides the present invention with its self-learning architecture, allowing feedback to refine the detection based on an individual ship/system architecture.

Video and alarm retention and backup is advantageous to the present invention. A backup storage subsystem is located at every camera acting as a buffer between live video being captured, analyzed, and transmitted across the network to the server and workstations. In the event of a server failure or outage, or a network failure or outage, live video and events are continuously recorded and retained locally at the camera providing a fully redundant system for video storage, maximizing uptime and compliance, and reducing the likelihood of a single item system failure from causing system wide disruption. Moreover, the use of computer analytics in the detection algorithm is merged with the laser scanning system to increase the performance of the detection system.

Figure 8:
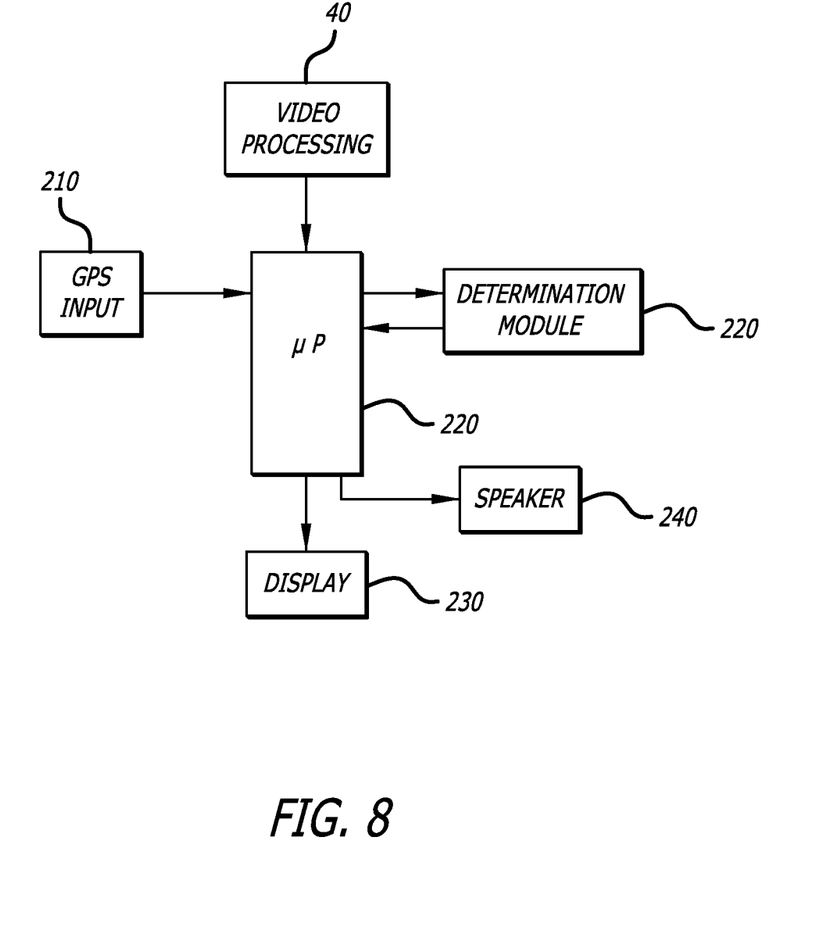
FIG. 8 is a schematic of a determination system for determining the character of a falling object.

FIG. 8 is a simplified schematic of a determination feature of the system for determining whether a falling object is a MOB event. A processor 200 receives input from the video processor 40 along with GPS input 210 (which may also be encoded in the video prior to arrival at the processor 200). Software running on the determination module 220 receives video information and performs an analysis of various factors relating to the event, such as the area of the object, the rate of descent, and other factors pertaining to the falling object. The determination module then evaluates the information on the falling object and determines if the falling object is human or inanimate based on the criteria encoded in the module and the information derived from the video feed. This determination is then communicated to the processor 200, which displays the determination in the form of an alarm on the display 230 as well as an audible alarm via speaker 240.

Ships have many configurations across the marine industry, thus requiring a detection system that is adaptable to the specific environment for which it is deployed in. The system of the present invention effectively monitors the sensors to learn nominal as compared with anomalous behavior within data streams through real-time operation. This allows the system to be "trained" to hone in on MOB events while rejecting non-events. By autonomously and continuously monitoring and classifying what constitutes nominal behavior within a field of view, the system of the present invention produces the crew manage relevant alerts and therefore allows the crew to identify and detect truly unexpected and unpredictable MOB events.

The foregoing descriptions and illustrations are intended to be exemplary only, and not limiting. One of ordinary skill in the art would readily understand and appreciate that various modifications and substitutions could be made to the invention without departing from the spirit of the invention, and the inventor intends that all such modifications substitutions be included in the scope of the present invention. Accordingly, the invention is not limited by any of the examples or depictions herein, but rather the scope of the invention is to be measured by the words of the appended claims, using their customary and ordinary meanings, in light of the descriptions herein.

I claim:

1. A surveillance and detection system for a ship, comprising:
    an array of detection stations deployed around the ship, each detection system including a laser detector for detecting a falling object and a thermal imaging camera for recording the falling object's descent;
    a video storage and retrieval arrangement for storing and recalling video from a selected one of the thermal imaging camera;
    a processor coupled to the array of detection stations, the processor configured to determine whether the falling object is a human; and
    the processor further configured to refine future determinations of whether objects are human by past successful and unsuccessful determinations of whether falling objects are human.

2. The surveillance and detection system of claim 1, wherein the laser detector uses a Near-Infrared Light Detection and Ranging Laser (NIR-LIDAR).

3. The surveillance and detection system of claim 2, wherein the laser performs a scan one hundred times per second.

4. The surveillance and detection system of claim 1, wherein the thermal imaging camera operates in a long wave infrared (LWIR) range.

5. The surveillance and detection system of claim 4, wherein the thermal imaging camera further includes a mode that operates in a visible light spectrum.

6. The surveillance and detection system of claim 1, wherein GPS data is automatically recorded for a location of the falling object.

7. The surveillance and detection system of claim 1, wherein the laser detector can detect a falling object having an area of ten square inches.

8. The surveillance and detection system of claim 1, wherein a display can show historical video and real time video relating to the falling object.

9. The surveillance and detection system of claim 1, further comprising a backup storage subsystem at every camera acting as a buffer between live video being captured, analyzed, and transmitted across a network to a server, such that in the event of a server failure, live video is continuously recorded and retained locally at the camera's storage substation.

* * * * *